United States Patent [19]

Segerson et al.

[11] E Re. 30,877

[45] Reissued Mar. 9, 1982

[54] MECHANISM FOR RELEASABLY ATTACHING AN OBJECT TO A KITE

[76] Inventors: James M. Segerson, 6871 Meadowbrook, Olive Branch, Miss. 38654; Bert G. Clawson, 983 McClure, Memphis, Tenn. 38116

[21] Appl. No.: 162,365

[22] Filed: Jun. 23, 1980

Related U.S. Patent Documents

Reissue of:

[64] Patent No.: 4,194,709
Issued: Mar. 25, 1980
Appl. No.: 951,781
Filed: Oct. 16, 1978

[51] Int. Cl.[3] ..... B64C 31/06

[52] U.S. Cl. ..... 244/155 R; 24/133; 24/131 R; 43/4.5

[58] Field of Search ..... 244/153 R, 155 A, 155 R; 43/4, 4.5, 43.13; 24/131 R, 132 R, 133

[56] References Cited

U.S. PATENT DOCUMENTS

| | | | |
|---|---|---|---|
| 692,998 | 2/1902 | Fletcher | 244/155 R |
| 1,787,479 | 1/1931 | Jacobi | 244/155 R |
| 1,804,244 | 5/1931 | Brady | 244/155 R |
| 1,816,814 | 8/1931 | Ater | 244/155 R |
| 2,000,891 | 5/1935 | Kries | 24/133 |
| 2,059,634 | 11/1936 | Fisher | 244/155 R |
| 2,464,720 | 3/1949 | Rose | 244/155 R |
| 3,583,662 | 6/1971 | Bury | 244/155 A |
| 4,183,481 | 1/1980 | Elson | 244/155 R |

FOREIGN PATENT DOCUMENTS

| | | | |
|---|---|---|---|
| 2002872 | 7/1970 | Fed. Rep. of Germany | 244/155 R |
| 1535535 | 12/1978 | United Kingdom | 244/155 R |

*Primary Examiner*—Galen L. Barefoot
*Attorney, Agent, or Firm*—Walker & McKenzie

[57] ABSTRACT

A mechanism for releasably attaching a parachute to a kite to allow the parachute to be carried aloft by the kite and to be released while the kite is in flight when the flight string of the kite is merely given slack. The mechanism [includes] *may include* a first member fixedly attached to the kite and a second member pivotally attached to the first member and fixedly attached to the end of the flight string. The second member is moveable from a first position in which the parachute is attached to the kite to a second position in which the parachute is released from the kite. The second member is held in the first position when the kite is aloft and the flight string is held substantially taut. The second member will then move to the second position when the flight string is given slack.

8 Claims, 8 Drawing Figures

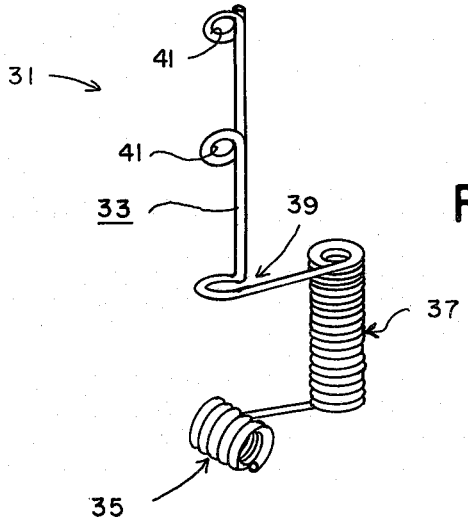
FIG.4
FIG.5
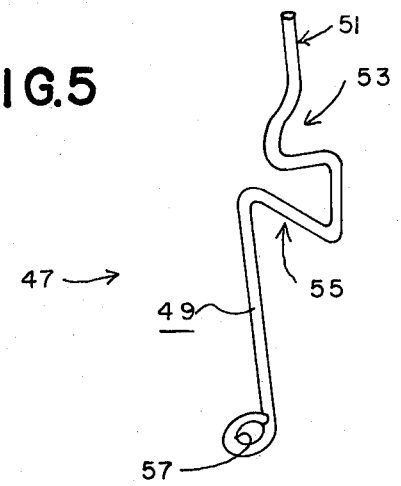
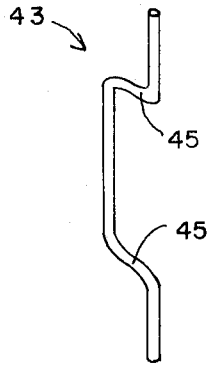
FIG. 6

MECHANISM FOR RELEASABLY ATTACHING AN OBJECT TO A KITE

Matter enclosed in heavy brackets [ ] appears in the original patent but forms no part of this reissue specification; matter printed in italics indicates the additions made by reissue.

BACKGROUND OF THE INVENTION

1. Field of the Invention:

This invention relates in general to kites and specifically to mechanisms for releasably attaching objects to kites.

2. Description of the Prior Art:

Heretofore, various kites and attachments therefore have been developed which relate generally to the present invention. See, for example, Fletcher, U.S. Pat. No. 692,998; Haight, U.S. Pat. No. 1,484,775; Albrecht, U.S. Pat. No. 1,735,309; Ater, U.S. Pat. No. 1,816,814; Berthene, U.S. 2,575,157; Toth, U.S. Pat. No. 2,822,998; Tucci, U.S. Pat. No. 3,052,434; Fricke, U.S. Pat. No. 3,088,701; Bury, U.S. Pat. No. 3,583,662; and Stritzke, U.S. Pat. No. 3,960,347. None of the above patents disclose or suggest the present invention.

The prior art devices for releasably attaching objects to kites rely on relatively complex mechanisms (e.g., the knife-carrier mechanism of Fletcher, the trolley mechanism of Haight, the balloon mechanism of Berthene, and the like) and/or a pronounced jerking, tugging or whipping motion of the flight string for causing an object carried by a kite to be released.

SUMMARY OF THE INVENTION

The present invention is directed towards improving upon prior mechanism for releasably attaching objects to kites. The concept of this invention is to provide such a mechanism which is relatively simple in construction and operation and which does not require any jerking, tugging or whipping motion of the flight string other than that which normally occurs in flying a kite to release the object.

The mechanism of the present invention includes [a first member] *means* for being fixedly attached to a kite and [a second member for being pivotally attached to the first member and] for being fixedly attached to the end of the flight string of the kite. The [second member] *means* is moveable between a first position in which the object is attached to the kite and a second position in which the object is released therefrom. The [second member] *means* is held in the first position when the kite is aloft and the flight string is held substantially taut. The [second member] *means* moves to the second position when the flight string is given slack.

BRIEF DESCRIPTION OF THE DRAWINGS

FIG. 4 is a perspective view of [the] *a* first member of the mechanism of the present invention.

FIG. 5 is a perspective view of [the] *a* second member of the present invention.

FIG. 6 is a perspective view of a staple member of the present invention.

DESCRIPTION OF THE PREFERRED EMBODIMENT

Figure 1:
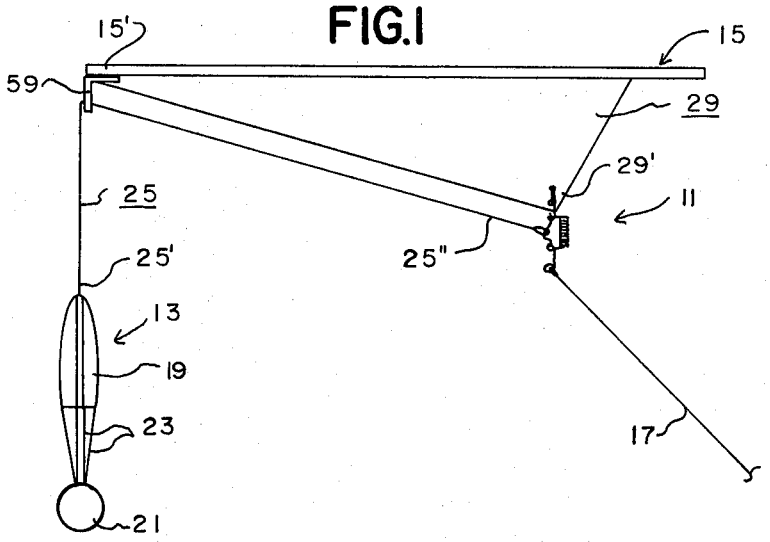
FIG. 1 is a side elevational view of a kite showing the mechanism of the present invention attached thereto and showing an object attached to the kite.
Figure 2:
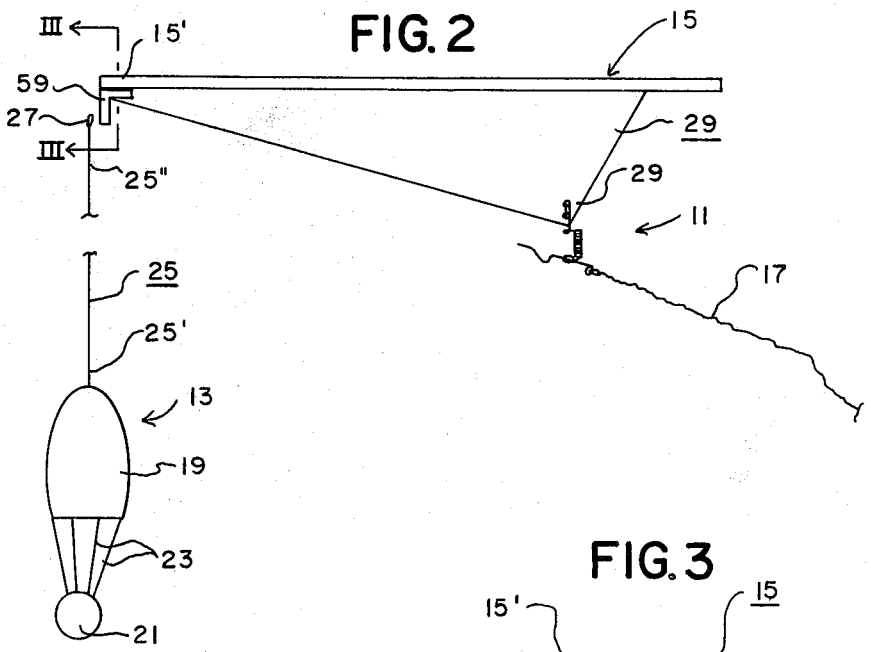
FIG. 2 is a side elevational view of a kite similar to FIG. 1 but showing the object being released from the kite.

The mechanism 11 of the present invention is for releasably attaching a parachute 13 or other object to a kite 15 for allowing the parachute 13 to be carried aloft by the kite 15 as depicted in FIG. 1 and to be released while the kite 15 is *in* flight and when the flight string 17 of the kite 15 is given slack as depicted in FIG. 2. The parachute 13 may be of any substantially typical construction including an air bag 19, a weight 21, and a plurality of strings 23 connecting the weight 21 to the air bag 19 as will be apparent to those skilled in the art. An elongated flexible member such as a length of string 25 is attached to air bag 19 for use in attaching the parachute 13 to the mechanism 11. More specifically, the length of string 25 has a first end 25' fixedly attached to the air bag 19 in any manner apparent to those skilled in the art and has a second end 25" for being releasably attached to the mechanism 11 in a manner which will hereinafter become apparent. A ring member 27 may be attached to the second end 25" of the length of string 25 for use in releasably attaching the length of string 25 to the mechanism 11. The kite 15 may be of any Preferably, the kite 15 is of the type having a downwardly depending keel member 29 as clearly shown in the drawings extending along the middle of the kite 15 from front to rear.

The mechanism 11 includes *means for being pivotally attached to the kite 15 and for being fixedly attached to the end of the flight string 17. The means has a keeper portion for selectively retaining the parachute 13 or other object to be carried aloft by the kite 15. The means has a first position in which the keeper portion will retain the parachute 13 and has a second position in which the keeper portion will release the parachute 13. The means is held in the first position when the kite 15 is aloft and the flight string 17 is held substantially taut and moves to the second position when the kite 15 is aloft and the flight string 17 is given slack.*

*In one embodiment, the mechanism 11 includes* a first member 31 (see, in general, FIG. 4) for being fixedly attached to the kite 15. The first member 31 is preferably formed out of a single, elongated length of spring wire 33. The length of wire 33 is preferably formed or bent so as to include a hollow tube-like portion 35, a tension spring portion 37, a catch portion 39 and a pair of apertures 41 as clearly shown in the drawings for reasons which will hereinafter become apparent. The tension spring portion 37 is located between the catch portion 39 and the tube-like portion 35 as clearly shown in FIG. 4 for allowing the catch portion 39 to move relative to the tube-like portion 35 for reasons which will hereinafter become apparent.

Figure 7:
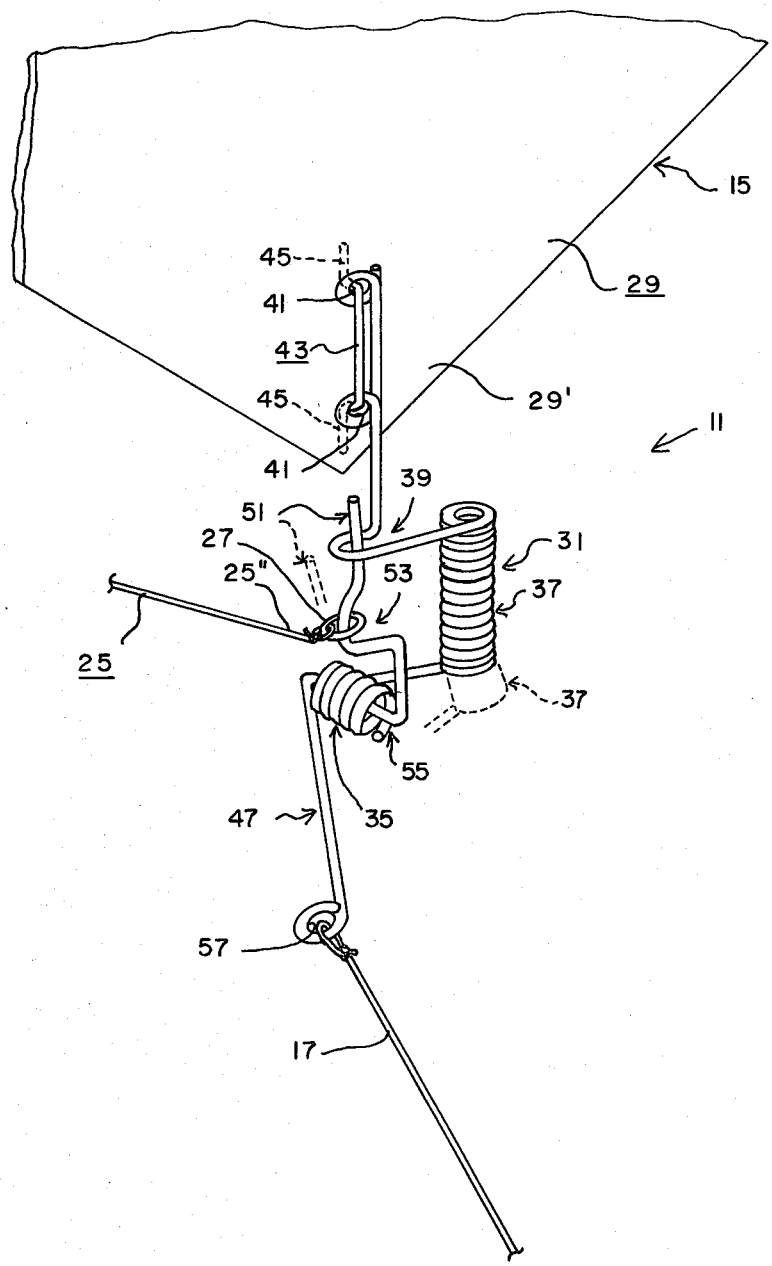
FIG. 7 is a perspective view of the mechanism of the present invention showing the mechanism attached to a kite and showing the second member of the mechanism of the present invention in the first position.

The mechanism 11 may include a staple member 43 (see, in general, FIG. 6) for fixedly attaching the first member 31 to the kite 15. More specifically, the staple member 43 includes a pair of leg portions 45 for extending through the pair of apertures 41 of the first member 33 and through a portion of the kite 15 for being turned back at a substantially 90° angle to thereby fixedly attach the first member 31 to the kite 15 as clearly shown in FIGS. 7 and 8. Preferably, the staple member 43 is used to attach the first member 31 to the kite 15 at substantially the lowest point 297 of the keel member 29 as clearly shown by the drawings.

The mechanism 11 includes a second member 47 (see, in general, FIG. 5) for being pivotally attached to the first member 31 and for being fixedly attached to the end of the flight string 17. The second member 47 is preferably formed of a single, elongated length of spring wire 49. The length of wire 49 is preferably formed or bent so as to include a pin portion 51, a keeper portion 53, a pivot rod portion 55, and an aperture 57, as clearly shown in FIGS. 7 and 8 to thereby pivotally attach the second member 47 to the first member 31. The pin portion 51 of the second member 47 coacts with the catch portion 39 of the first member 31 for causing the second member 47 to be selectively held in a first position as shown in solid lines in FIG. 7. The keeper portion 53 of the second member 47 coacts with the ring member 27 to selectively retain the parachute 13 to the kite. More specifically, the ring member 27 encircles the length of wire 49 at the keeper portion 43 as clearly shown in FIG. 7. The flight string 17 is attached to the second member 47 by being extended through the aperture 57 and being tied thereto as clearly shown in FIGS. 7 and 8.

Figure 3:
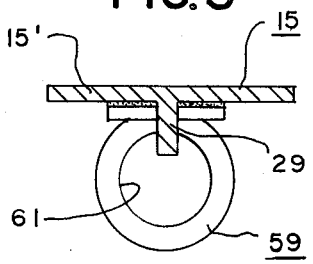
FIG. 3 is an enlarged sectional view as taken on line III—III of FIG. 2.

The mechanism 11 preferably includes a hoop member 59 for being attached to the tail end 15' of the kite 15 as clearly shown in FIGS. 1 and 2. The hoop member 59 has an aperture 61 therethrough (see FIG. 3) of a size sufficient to allow the ring member 27 to freely pass therethrough. The hoop member 59 may be fixedly attached to the kite 15 in any manner apparent to those skilled in the art such by way of glue or the like.

Figure 8:
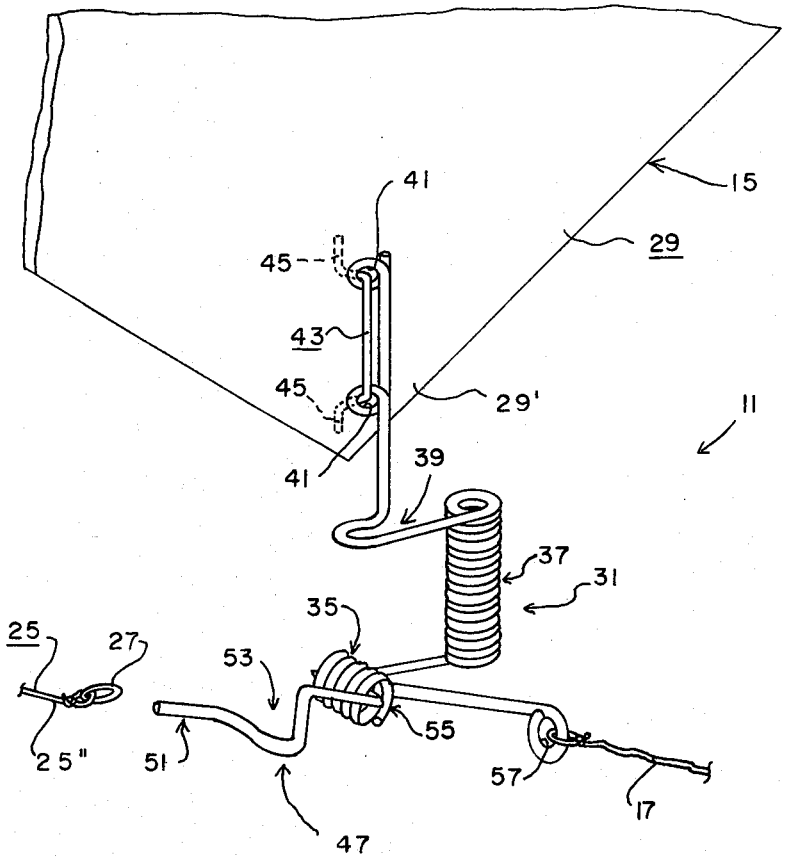
FIG. 8 is a perspective view of the mechanism of the present invention showing the mechanism attached to a kite and showing the second member of the mechanism in the second position.

The operation and use of mechanism 11 of the present invention is quite simple. Once the first member 31 and the hoop member 59 have been attached to the kite 15 as heretofore discussed, with the second member 47 pivotally attached to the first member 31, the parachute 13 is attached to the kite 15 by passing the ring member 27 and the length of string 25 through the aperture 61 of the hoop member 59 as depicted in FIG. 1. The ring member 27 is then passed over the pin portion 51 of the second member 47 and positioned in the keeper portion 53 thereof. The pin portion 51 of the second member 47 is then positioned within the catch portion 39 of the first member 31 as clearly shown in FIG. 7. Next, with the flight string 17 attached to the second member 47, the kite 15 is launched in a conventional manner. Once the kite 15 is aloft the resistance of the air on the kite 15 will cause the tension spring portion 37 of the first member 31 to stretch somewhat as shown in broken lines in FIG. 7. This will cause the pin portion 51 of the second member 47 to become disengaged from the catch portion 39 of the first member 31 as shown in broken lines FIG. 7. The second member 47 will remain in the first position with the ring member 27 held in the keeper portion 53 as long as the flight string 17 is held substantially taut. However, when it is desired to release the parachute 13 from the kite 15, the flight string 17 is given slack and the second member 47 will pivot to the second position as shown in FIG. 8 whereupon the weight 21 of the parachute 13 will cause the ring member 27 to slide off the second member 47 and pass through the aperture 61 of the hoop member 59 allowing the parachute 13 to drop to the ground due to the force gravity as depicted in FIG. 2.

Although the invention has been described and illustrated with respect to a preferred embodiment thereof, it is not to be so limited since changes and modifications may be made therein with or within the full intended scope of the invention.

We claim:

1. A mechanism for releasably attaching an object to a kite to be carried aloft by the kite and to be released while the kite is in flight when the flight string of the kite is given slack, said mechanism comprising:

(a) a first member for being fixedly attached to the kite; and (b) a second ember for being pivotally attached to said first member and for being fixedly attached to the end of the flight string, said second member including a keeper portion for selectively retaining the object to be carried aloft by the kite, said second member having a first position in which said keeper portion will retain said object and having a second position in which said keeper portion will release said object, said second member being held in said first position when the kite is aloft and the flight string is held substantially taut, said second member moving to said second position when the kite is aloft and the flight string is given slack.

2. The mechanism of claim 1 in which said first member includes a catch portion and in which said second member includes a pin portion for being selectively held within said catch portion of said first member.

3. The mechanism of claim 2 in which said first member includes a tube-like portion and in which said second member includes a pivot rod portion for passing through said tube-like portion of said first member to thereby pivotally attach said first and second members together.

4. The mechanism of claim 3 in which said first member includes a tension spring portion located between said catch portion and said tube-like portion for allowing said catch portion to move relative to said tube-like portion.

5. The mechanism of claim 4 in which is included a staple member; said first member has a pair of apertures for coacting with said staple member to allow said first member to be fixedly attached to the kite; and in which said second member has an aperture for coacting with the end of the flight string to allow said second member to be fixedly attached to the end of the flight string.

6. The mechanism of claim 5 in which said first member is formed of a single length of wire and in which said second member is formed of a single length of wire.

7. The mechanism of claim 6 in which is included a hoop member for being attached to the tail end of the kite; in which said first member is for being fixedly attached to the mid-portion of the kite; and in which is included an elongated, flexible member for being attached to the object to be releasably attached to the kite, said elongated, flexible member having an aperture therethrough adjacent the end thereof opposite the object for being releasably positioned on said second member.

*8. A mechanism for releasably attaching an object to a kite to be carried aloft by the kite and to be released while the kite is in flight when the flight string of the kite is given*

*slack, said mechanism comprising: a means for being pivotally attached to the kite and for being fixedly attached to the end of the flight string, said means including a keeper portion for selectively retaining the object to be carried aloft by the kite, said means having a first position in which said keeper portion will retain said object and having a second position in which said keeper portion will release said object, said means being held in said first position when the kite is aloft and the flight string is held substantially taut, said means moving to said second position when the kite is aloft and the flight string is given slack.*

* * * * *